United States Patent [19]

Pellegrino

[11] 4,296,849

[45] Oct. 27, 1981

[54] AUTOMATIC TORQUE REGULATOR

[76] Inventor: Luigi Pellegrino, Conicit Apdo. 70,617 Los Ruices, Carcas, Venezuela, 107

[21] Appl. No.: 55,604

[22] Filed: Jul. 9, 1979

[30] Foreign Application Priority Data

Jan. 12, 1979 [VE] Venezuela ............................. 44/68

[51] Int. Cl.³ .......................................... F16D 31/04
[52] U.S. Cl. .................................... 192/61; 192/94; 192/95
[58] Field of Search ............................. 192/61, 94, 95

[56] References Cited

U.S. PATENT DOCUMENTS

| 2,311,237 | 2/1943 | Loveday | 192/61 |
| 2,329,594 | 9/1943 | Corrigan | 192/61 |
| 3,078,976 | 2/1963 | Whinery et al. | 192/61 |
| 3,331,482 | 7/1967 | Keramas | 192/95 |
| 3,404,761 | 10/1968 | Jaeschke et al. | 192/61 |

Primary Examiner—Allan D. Herrmann
Attorney, Agent, or Firm—Phillips, Moore, Weissenberger, Lempio & Majestic

[57] ABSTRACT

An automatic torque regulator couples a motor to a load and automatically and continuously varies the torque delivered to the load to avoid large and sudden loading of the motor as can occur during start-up and shutdown. This regulator solves the problems associated with prior art regulators by being operable over a range of rotational speeds and by being adjustable in said range of rotational speeds without having to stop said regulator.

15 Claims, 6 Drawing Figures

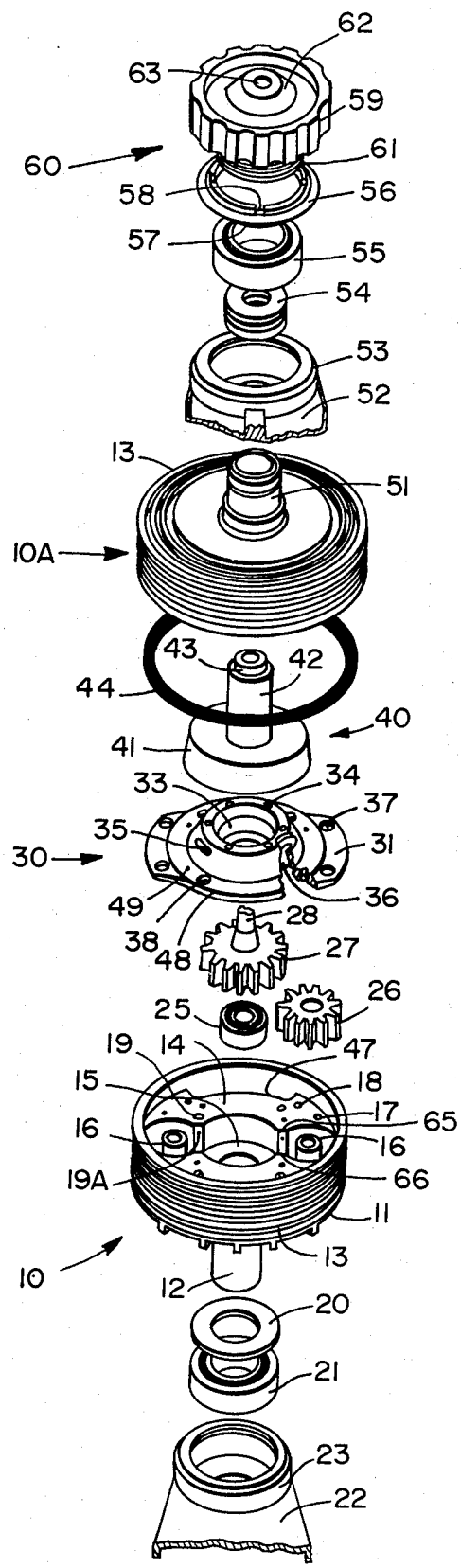
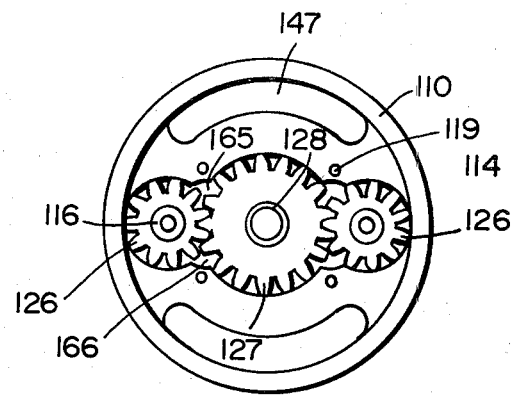
FIG. 4
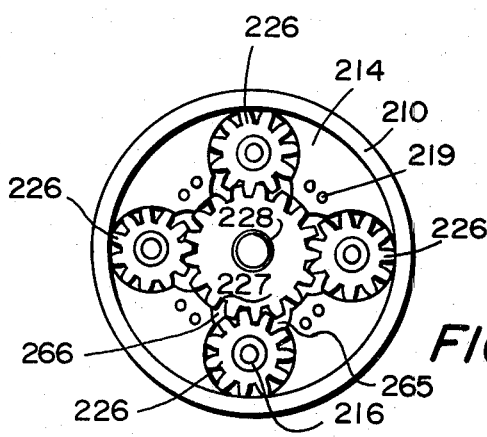
FIG. 5
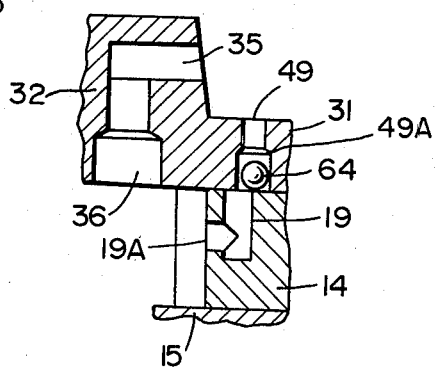
FIG. 6
FIG. 3

AUTOMATIC TORQUE REGULATOR

TECHNICAL FIELD

The present invention concerns torque regulators for mechanisms using rotational elements. More particularly, it refers to automatic devices which regulate the output torque of a rotational system as a function of the resistance offered to the rotation of such a system.

BACKGROUND ART

It can be stated, in general, that all rotational systems, that is to say, any which produces a rotational force of a given magnitude, encounters problems with the resistance offered by the load which it drives. It is well known that any motor, for example, must overcome a larger resistance upon starting, given the fact that it must drive a static load into motion. Such a resistance will diminish as the load approaches the rotational speed of the motor. Similarly, when it is necessary to stop a moving rotational load, the resistance increases in the opposite direction inasmuch as it is also necessary to overcome inertia which is proportional to the driven mass. This resistance, in certain specific applications, is particularly large either as a consequence of the fact that a large mass must be started or stopped, or because the relative weight of the mass changes in going from one medium to another. As in the example of the first case, one can cite the starting mechanisms used in pump systems for water and other fluids, transmission belts, cranes, compressors, elevators, etc. Whereas, as an example of the second case, one can cite winch systems for fishing nets and other fishing techniques, booms for hauling up fishing nets, capstans for maritime rescues, etc., wherein, for example, the weight of the mass changes as it is pulled from a water environment into an air environment.

Thus far attempts have been made to solve these problems, which can give rise to excessive stress in the motors and even cause substantial damage, by means of torque converters which help overcome the resistance offered to the rotation. However, it is well known that such converters can only operate at a given rotational speed. Accordingly, if the problem appears when the rotational speed is outside the operating range of the converter, the converter will not work. And, if it does, it will not work adequately, thus overloading the motor with a substantial part of the additional effort required for overcoming the resistance.

On the other hand, such converters, due to their own operation, generate enormous amounts of heat. This heat has made it necessary to provide a cooling system, accompanied by all its associated maintenance problems, as well as space problems, which further complicate the implicit requirements of the converters themselves.

Now, some converters have the property of being capable of changing the input rotational speed. However, such a change must take place after the entire system is brought to a stop, in order to carry out the necessary adjustments for bringing the converter into the calculated range in which it can be useful. In addition to the possibility of errors in the calculation, and disadvantage that it is necessary to stop the system in order to carry out the adjustment, these converters have the disadvantage that it is necessary that such adjustment be determined by highly qualified personnel, and carried out by experienced technicians.

This all demonstrates the necessity for an automatic torque regulator capable of operating at practically any power to resistance ratio, at any rotational speed of the system, and in any medium or between different media.

SUMMARY OF THE INVENTION

The present invention is directed to overcoming one or more of the problems as set forth above.

Accordingly in one aspect of the invention an automatic torque regulator comprises a hollow chassis which is mounted for rotation and which contains a volume of hydraulic fluid, and a central gear located in the interior of the chassis which is capable of rotating independently of the rotation of the chassis. A plurality of satellite gears, mounted to the chassis, are in contact with the central gear and arranged so that they are rotated with the chassis. Pressure chambers are defined near the points of contact between the satellite gears and the central gear. Communication means establish communication of the fluid between said chambers and the hydraulic fluid of the hollow chassis. Flow regulating devices control the flow of fluid through said communicating devices.

The goal of the present invention is to provide a torque regulating device capable of determining the degree of torque resistance, as a function of the resistance offered by the load, outputting only part of the degree of resistance to the motor, and continuously and automatically varying it until it is practically eliminated when the load and the motor reach an optimal torque ratio.

A specific goal of the present invention is to provide an automatic torque regulating device capable of operating both to increase as well as to decrease such a torque; i.e., so that it is completely and automatically reversible.

Another goal of the invention is to provide such an automatic device which is adaptable to any transmission system, either by coupling the device directly to the axis or by means of transmission belts, gears, etc.

Another goal of the invention is to provide such a regulating device which is capable of being regulated in order to achieve the optimal operating point, without having to stop the system to which it is connected, and to carry out such regulation manually or by remote control, with a hydraulic, pneumatic or electric transmission.

A final goal of the invention is to provide a highly efficient regulator having a system of cooling by heat dissipators which occupies a much smaller volume than conventionally known systems, and which is made of highly resistant and extremely light materials.

Finally, another advantage of the invention is that such a regulator can also be coupled to reversible motors. This may be done without further adjustment, and can be carried out efficiently and adequately in both directions without losing any of its advantageous characteristics.

These and other advantages and goals of the invention can be better understood from a reading of the following detailed description of the preferred embodiments.

BRIEF DESCRIPTION OF THE DRAWINGS

FIG. 3 is an exploded perspective view showing the parts constituting the regulator of this invention in the positions occupied with respect to one another.

FIG. 4 is a diagramatic plan view illustrating a first embodiment of the invention, in which two planetary or satellite gears are used.

FIG. 5 is a view similar to FIG. 4 illustrating the second embodiment of the invention, in which four satellite gears are used; and FIG. 6 is an enlarged partial view of a vertical section showing the fluid channels through which the hydraulic fluid of the device flows.

DETAILED DESCRIPTION OF THE PREFERRED EMBODIMENT

In general terms, the device of the present invention is a hydraulic torque regulator capable of being inserted into a working system between the motor (not shown) and the load (not shown), in order to act as a type of "clutch" between said motor and the load, in situations where the effort of the motor increases above the normal as a consequence of a sudden and large load resistance. This "clutch" action can be automatically corrected as a function of the reduction of said resistance offered by the load to the action of the motor.

An external part of the device is functionally coupled to the motor, either directly to the axis or by means of some type of transmission. An internal part of the device is functionally coupled to the load, again either directly or by means of a transmission or a device which changes the direction or type of motion imparted by the motor. The part which is functionally coupled to the load is capable of rotating independently with respect to the part which is coupled functionally to the motor. The mechanical connection between both parts is established by means of a gear consisting of a central gear which is concentric with the output axis of the device, and is generally also concentric with the axis by which it is couple to the motor, and a plurality of satellite or planetary gears capable of rotating inside the device, by being geared directly with the central gear. A fluid fills a substantial part of the interior of the device, and it is carried by the rotational action of the satellite gears to input chambers located between the central gear and each satellite gear, at the point at which the gear teeth mesh. The fluid is thus forced to flow into an output chamber from which it must leave the gears by means of the pumping action of the gear teeth themselves, which action establishes a circulation. This circulation will determine a larger or smaller resistance to the rotation of the output axis, independently of the rotational speed of the motor and the external part which is functionally connected to it. The heat generated by the device is dissipated by means of a plurality of heat dissipators located over the entire external surface of the device.

Figure 1:
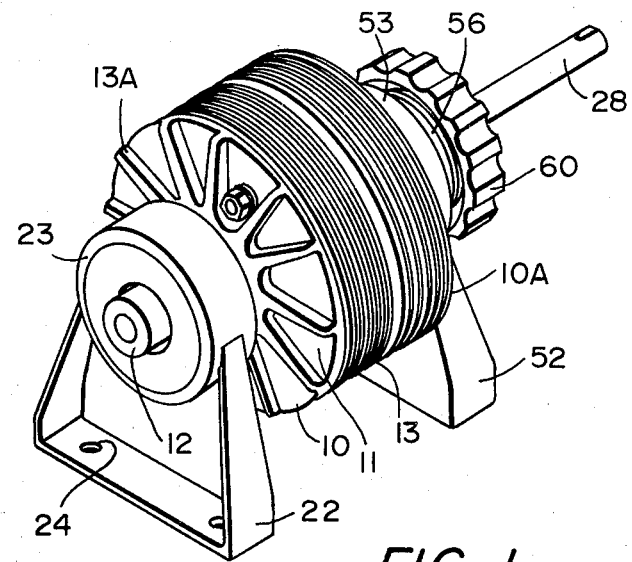
FIG. 1 is a conventional perspective view of an automatic torque regulator according to the invention.
Figure 2:
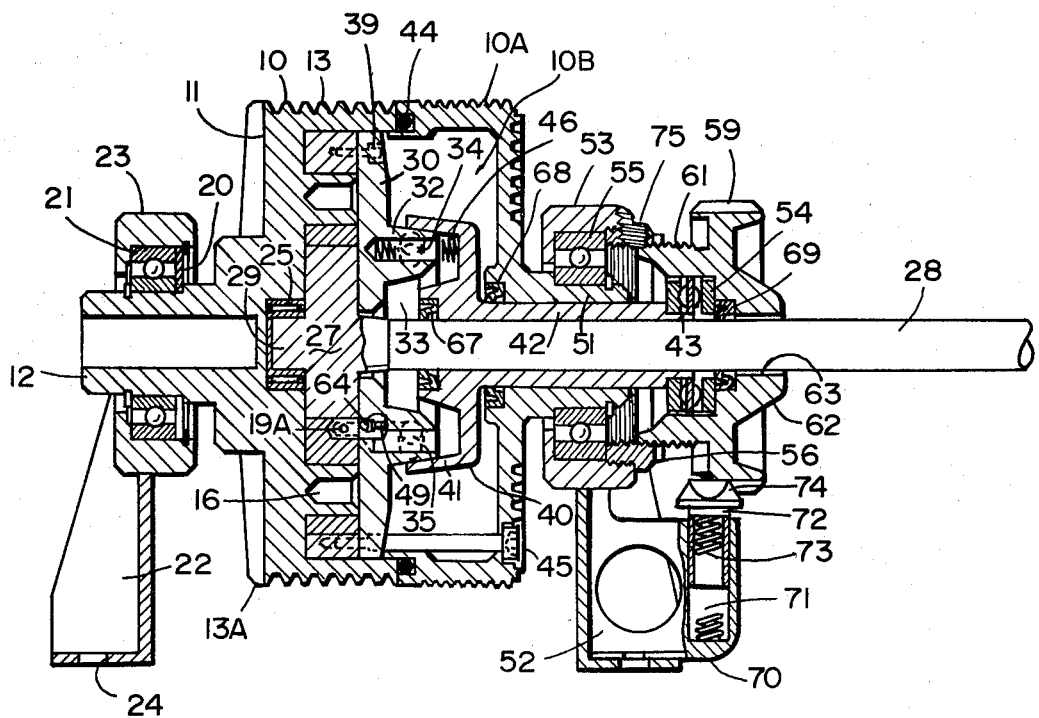
FIG. 2 is a longitudinal section view showing the interior of the regulator shown in FIG. 1.

A more detailed reference to the drawings shows the regulator of the invention having a hollow cylindrical body or cavity 10B, which is formed by two halves of the chassis 10, 10A (FIG. 1). Each half 10,10A has a plurality of fins and grooves on the outside which act as heat dissipators. A cylindrical axis 12 extends axially from the geometrical center of the end circular wall 11 of the half 10 (FIG. 2). A plurality of external circumferential grooves 13 and radial rins 13A, act as heat dissipators. A protruding seat 14 (FIG. 3) formed by two symmetrically opposite halves having a generally arched configuration, yielding a central circular space and two lateral circular spaces which are diametrically opposite to one another, is located inside wall 11. The central space has a circular seat with a bottom 15 through which the axis 12 projects. A pair of cylindrical trunnions 16 are provided, one for each lateral circular space. Said lateral spaces and the central space are connected and open to one another.

Each half of the protruding seat 14 is provided with holes 17 capable of receiving connecting bolts 45 (FIG. 2) which can couple the halves of the chassis 10 and 10A. Additional holes 18 are provided in the protruding seat 14 for attaching a cap 30 (FIGS. 2 and 3) which will be described below. Passages 19 (FIGS. 3 and 6) are provided which penetrate said seat 14 in a longitudinal direction, and which connect with radial passages 19A, which open into a portion of the internal lateral wall of the protruding seat 14, precisely at the portion shared by the central space and the corresponding lateral space.

A washer 20 is located on the axis 12 which projects from the half 10, followed by a bearing 21, which is held in a support 22, which has an upper cylindrical end 23, within which the bearing 21 is inserted. Axis 12 passes through bearing 21 and extends beyond said support 22, in order to couple with the motor (not shown), as previously stated. Said support 22, which has a shape that is generally trapezoidal, can be attached to a pedestal or any suitable surface by means of screws (not shown), which can be inserted into the holes 24 (FIG. 1).

A bearing 25 (FIGS. 2 and 3) is inserted into the central interior space around which the central circular seat 15 extends. A central gear 27, which is formed as a single piece with the axis 28, making up the central ouput axis of the device, lies directly on said bearing. A cylindrical trunnion 29 (FIG. 2) projects from the opposite side of gear 27. Said axis 28 is inserted into cap 30. Cap 30 has a flange 31 which is generally circular and flat, whose central portion is raised in order to define a conical part 32, which surrounds a central opening 33 through said axis 28 passes. A plurality of shallow circular holes 34 are provided in the upper edge of the conical part which hold a corresponding plurality of springs 46 (FIG. 2) which extend in an axial direction outside the space covered by the cap 30.

A plurality of elongated openings 35 (FIGS. 3 and 6), located in the conical wall 32, are connected with an interior passage 36 (FIG. 6) which extends downward to the lower face of cap 30. The cap 30 is attached to the protruding seat 14 by means of screws 39 (FIG. 2) which extend through the holes 38 of the flange 31 of the cap, and are received in the holes 18 of the protruding seat 14. Holes 37, together with the holes 17 of the seat 14, provide a means of attaching the half 10A to the half 10 of the chassis. Furthermore, the cap 30 has additional holes 49 which are arranged to coincide partially with the holes of the ducts 19 (see detail in FIG. 6), and insicde of which are located spheres 64 which act as valves, as will be explained below. In this way, the space enclosed by the cap 30 in the half 10 will be connected with the exterior of the cap 30 by means of passages 35, 36 and by means of passages 19, 19A, and 49, in order to establish a circulation of the fluid between the interior and exterior of said cap.

It can be seen in FIG. 3 that the protruding seat 14 has a depression in the upper internal edge, indicated as 47, and that the cap 30, coincidentally, has a matching protrusion 48 on its periphery which leaves such depression open. The purpose is to leave said depression 47 as an additional portion of the space outside the cap 30. It should be mentioned here that all the space outside the cap 30, which is closed by the half 10A, will be filled with a hydraulic fluid which will circulate through the ducts, passages, and openings mentioned previously in said cap.

An outer cap 40, which has a short conical flange 41, is located after cap 30 on the axis 28. As can be seen in FIG. 2, flange 41 has a length adequate to cover the elongated openings 35, and is laid on the central conical portion 32 of the cap 30, compressing plurality of springs 46. The outer cap 40 is provided with a tubular extension 42 (FIGS. 2 and 3), which ends in a step at the end 43. Such an extension is designed to extend through the end cylindrical portion 50 of half 10A.

All elements which have just been described are contained in the interior of the device, and are covered by the half 10A of the chassis. Said half 10A is designed to form a hermetic seal with the half 10, by inserting of the packing 44, into which the circular edges of both halves. Said halves are held together by means of bolts which pass through the holes 37 and are received in holes 17, as has been previously mentioned. The reason for the existence of such a hermetic seal is that all the interior of the device is filled with hydraulic fluid, as has been previously mentioned. Furthermore, in order that said hydraulic fluid not escape through the crack between the axis 28 and the central opening of the outer cap 40, a packing 67 (see FIG. 2) is inserted between it and the cap 40. Another packing 68 is inserted between the outer cap 40 and the half 10A.

The cylindrical end portion 51 of the half 10A is designed to receive a bearing 55, which is received in the cylindrical passage of the circular end 53 of another support 52, which is similar to support 22 described previously. Both these supports hold the rotating device in its operating position. A securing ring 56 holds the position of the cylindrical end portion 51 with respect to the support 52. External threads 57 are provided in the lower end of ring 56, and edge grooves 58 are provided in the upper end of ring 56, in order to allow ring 56 to be screwed in or out with respect to the threads cut in the circular portion 53 of the support 52. A threaded radial opening 75 (see FIG. 2) fixes the position of the securing ring 56 with respect to the circular end 53, by means of a screw (not shown) or a pin introduced into it. A bearing 54 capable of withstanding an axial load finishes the assembly, and is located on the end of the end portion 51, and is covered by a threaded regulating element 60. This threaded regulating element 60 has an exteriorly threated lower end 61, which is capable of fitting the internal threads cut into the securing ring 56, and a generally cylindrical body provided with axial indentations 59, to give the appearance of an adjusting knob. An end portion 62 terminates in a circular central opening 63, through which the end of the output axis 28 extends.

Referring now to FIG. 2, it can be seen that there is a small cylindrical cap 70 in the support 52, formed as a single piece with it and which extends vertically. The bottom of the small cap 70 is closed and its upper end is open. An interior passage 71 traverses the entire small cap, and a rod 72 with a stop 74 is received in it, which pushes against the periphery of the knob 60 due to the action of the spring 73. The head of stop 74 is shaped so that it can be received inside an indentation 59 of said knob 60, so that knob 60 can be fixed in a specified rotational position, but can still be rotated in one direction or another, step by step, against the action of said spring.

Since said knob 60 is screwed into the securing ring 56, and this in its turn is immobilized in the circular end 53 of the support 52, then when the knob is rotated, its end will push to a greater or lesser extend against the axial thrust to the cylindrical end 43 of the outer cap 40. Outer cap 40 will then slide axially with respect to the cap 30, and against the action of the springs 46, in order to cover or uncover the elongated passages 35 so as to increase or decrease the volume of the hydraulic fluid which will pass through passages 35 and through the interior passage 36. As can also be seen in FIG. 2, a packing 69 is located between the knob 60 and the axial thrust bearing 54, in order to prevent any fluid from escaping through the space 63. In such a manner, the complete sealing of the interior of the device is guaranteed.

The operating of the device of the invention is described as follows. Since the axis 12 and the half 10 are made up of a single piece, and this is attached firmly to the half 10A and the cap 30, these portions rotate simultaneously with the axis 12 coupled to the motor. As the half 10 rotates, the satellite gears 26, held on axes 16, change their radial position with respect to the central gear 27. This change in position cannot be carried out without a corresponding rotational motion of the satellite gears, since the gears are in mutual contact. Normally, this rotation of the satellite gears would be translated into a rotation of the central gear 27. However, since said central gear 27 is functionally coupled to the load, and directly receives the load inertia or resistance to a change in condition, the satellite gears must "walk", i.e., they must roll on the stationary teeth of the central gear. The consequence of this is that two fronts are created. One front is in the direction of the displacement, and has a negative pressure, since the satellite gear rotates and creates a vacuum with respect to the central gear tooth which it is leaving, the other front has a positive pressure created as the satellite gear engages with a new central gear tooth toward which it is moving. This positive and negative pressure will be established in either of chambers 65 or 66 (FIG. 3), depending on the direction of rotation.

Since said chambers are closed by the cap 30 (not shown in said figures), and all of the outside of the cap is filled with hydraulic fluid, this fluid will tend to enter the chamber having a lower pressure (negative pressure) through passages 35,36 and 19,49 respectively (FIG. 6). The pressure of the fluid will be exerted on the side of the tooth of the central gear which is being left behind by the satellite gear which tends to push it in the direction of the rotational motion. As the satellite gear moves over the central gear teeth during its rotation, it pushes the fluid towards the zone of positive pressure, increasing said pressure, which will be exerted on the side of the central gear tooth immediately adjacent to said positive pressure chamber, also tending to push said central gear tooth in the direction of rotation, which is the same direction as established by the satellite gear.

In addition, the hydraulic fluid enters the negative pressure chamber by means of passages 35, 36 and passages 19, 49 and exits the positive pressure chamber by only passages 19, 49. The pressure in the positive pressure chamber is doubled, as a consequence of which the force which tends to move the central gear is likewise doubled. The exit of hydraulic fluid from the positive pressure chamber by means of a single passage is achieved by means of a sphere 64, which tends to rise in its passage 49 due to the positive pressure. The passage is provided with a constriction or seat means 49A against which the sphere comes into contact, thus closing said passage as fluid attempts to exit the positive pressure chamber, as can be seen clearly in FIG. 6. However, since the two passages 19 and 49 do not completely coincide, the sphere is unable to block passage 19, alowing the fluid to enter into the negative pressure chamber. Consequently, passages 35, 36 and 19, 49 and sphere 64 provide for greater resistance to fluid flow therethrough in one direction than the reverse direction. As can be seen by viewing FIGS. 3 and 6 together, there is greater resistance to the flow of fluid to body or cavity of chassis 10, 10A from pressure chamber 65, 66 than to flow in the reverse direction. It is to be understood that passage 49 and a similar passage depicted in FIG. 3 include the first and second primary passages in which first and second spheres such as sphere 64 are disposed, that passage 19 and a similar passage depicted in FIG. 3 include first and second secondary passages and that passages 35, 36 and similar passages depicted in FIG. 3 include first and second tertiary passages. Further, seat means 49A and a similar seat means in the second primary passage comprise the first and second seat means.

These hydraulic pressures exerted on the teeth of the central gear slowly increase its motion until its velocity is matched with the operating speed of the motor, such that the motor does not experience any additional forces above normal regardless of the difference in mass which it may have encountered or the difference in the relative weight of the load. It is clear that the amount of fluid which enters the chamber and which must circulate through the gears can be regulated by means of knob 60, as has been discussed previously, in such a way that the outer cap 40 opens or closes the passages 35.

FIG. 4 shows an embodiment of the invention in which only two satellite gears 126 are used with a central gear 127. In such a manner, there will be two positive pressure chambers and two negative pressure chambers, which duplicate the previously mentioned effect obtained with a single satellite gear. On the other hand, FIG. 5 illustrates an embodiment in which four satellite gears 226 are used with a central gear 227. In this way, four chambers of positive pressure and four of negative pressure are obtained, thus doubling the effect indicated by the embodiment of FIG. 4. The reference numbers of FIG. 4 are the same as indicated in the other figures, but are increased by 100; while those of FIG. 5 are increased by 200.

An extremely important aspect of the invention is the relation between the central gear and the satellite gears, regardless of their number. One of the premises of this invention is that the number of teeth in the central gear not be a multiple of the number of teeth in the satellite gears, in order that one of the satellite gears used, at least, must be out of phase with respect to the others, as is illustrated in FIGS. 4 and 5. That is to say that if a given satellite gear has its tooth introduced between two teeth of the central gear, the opposing satellite gears will have one tooth of the central gear introduced between two of its teeth. The purpose of this is to prevent phase coincidence from producing an undesirable noise in the device. Thus, the device by means of the provisions of the invention, is capable of operating quietly, since there will be no turbulence in the hydraulic fluid between the teeth, such as would occur if the number of teeth of the central and the satellite gears were in a multiple ratio.

From the foregoing description, one can see that the device of the invention is highly efficient, operates with any type of load, having any mass, is reversible, and is capable of starting or stopping a rotational system. It can be regulated for any specific purpose without requiring that the system be stopped; and it virtually eliminates any overloads on the motors with which it is coupled. However, it should be clearly pointed out that all the details described here and illustrated in the drawings have been presented only as illustrations, since changes, substitutions, and modifications in this description and the drawings can be appreciated by those of ordinary skill in the art.

I claim:

1. An automatic torque regulator comprising:
a chassis defining a cavity;
a central gear positioned in said cavity;
axis means for rotatably mounting said chassis and said central gear so that said central gear can be rotated independently from said chassis;
a satellite gear positioned in said cavity in engagement with said central gear;
means for rotatably mounting said satellite gear to said chassis;
means for defining first and second pressure chambers near the initial and final areas of contact between said central gear and said satellite gear;
means for providing fluid communication between said pressure chamber means and said cavity; and,
means for regulating the flow of fluid in said communication means; and
wherein said regulating means includes passages means for providing greater resistance to fluid flow therethrough in one direction than in the reverse direction.

2. The apparatus of claim 1 wherein said passage means provides greater resistance to fluid flow therethrough to said cavity from said pressure chambers.

3. The apparatus of claim 1 wherein said regulatory means includes another passage means for providing fluid communication between said pressure chamber means and said cavity and means for selectively restricting the flow of fluid through said another passage means.

4. An automatic torque regulator comprising:
a chassis defining a cavity;
a central gear positioned in said cavity;
axis means for rotatably mounting said chassis and said central gear so that said central gear can be rotated independently from said chassis;
a satellite gear positioned in said cavity in engagement with said central gear;
means for rotatably mounting said satellite gear to said chassis;
means for defining first and second pressure chambers near the initial and final areas of contact between said central gear and said satellite gear;
means for providing fluid communication between said pressure chamber means and said cavity and means for regulating the flow of fluid in said communication means; and
wherein said means for defining first and second pressure chambers comprise a protruding seat means for forming a central recess for containing the central gear; a lateral recess means for containing the satellite gear; and a cap means for covering the entire surface of the protruding seat and enclosing said central and satellite gears; and wherein said communication means includes first and second primary passages formed in the cap means; first and second secondary passages formed in the protruding seat means which are partially aligned with the first and second primary passage respectively thereof and wherein said first and second secondary passages communicate with said first and second chambers respectively; and first and second tertiary passages formed in said cap which extend angularly in said cap and open axially into said first and second chambers respectively; and wherein said regulating means includes an outer cap and means for selectively positioning said outer cap into a fluid flow restricting relationship with said tertiary passages.

5. The apparatus of claim 4 wherein said selectively positioning means includes a knob and detent means for restricting the movement of said knob.

6. An automatic torque regulator commprising:

a chassis defining a cavity; a central gear positioned in said cavity;

axis means for rotatably mounting said chassis and said central gear so that said central gear can be rotated independently from said chassis;

a satellite gear positioned in said cavity in engagement with said central gear;

means for rotatably mounting said satellite gear to said chassis;

means for defining first and second pressure chambers near the initial and final areas of contact between said central gear and said satellite gear;

means for providing fluid communication between said pressure chamber means and said cavity;

means for regulating the flow of fluid in said communication means; and wherein said means for defining first and second pressure chambers comprise a protruding seat means for forming a central recess for containing the central gear; a lateral recess means for containing the satellite gears; and a cap means for covering the entire surface of the protruding seat and enclosing said central and satellite gears; and wherein said communication means include first and second primary passages formed in the cap means; first and secondary passages formed in the protruding seat means which are partially aligned with the first and second primary passages respectively thereof and wherein said first and second passages communicate with said first and second chambers respectively; first and second tertiary passages formed in said cap which extend angularly in said cap and open axially into said first and second chambers respectively; first and second spheres located in said first and second primary passages, respectively; first seat means for cooperating with said first sphere in said first primary passage to prevent fluid from flowing from said first secondary passage through said first primary passage; and second seat means for cooperating with said second sphere in said second primary passage to prevent fluid from flowing from said second secondary passage through said second primary passage.

7. The apparatus of claim 6 wherein said axis means includes an output axis coupled to said central gear and an input axis coupled to said chassis.

8. The apparatus of claim 6 wherein said chassis contains a volume of hydraulic fluid.

9. The apparatus of claim 6 wherein said regulating means includes an outer cap and means for selectively positioning said outer cap into a fluid flow restricting relationship with said tertiary passages.

10. The apparatus of claim 9 wherein said selectively positioning means includes a knob and detent means for restricting the movement of said knob.

11. The apparatus of claim 6 including another satellite gear positioned in said cavity in engagement with said central gear, means for rotatably mounting said another satellite gear to said chassis and means for defining third and fourth pressure chambers near the initial and final area of contact between said central gear and said another satellite gear.

12. The apparatus of claim 11 including third and fourth satellite gears positioned in said cavity in engagement with said central gear, means for rotatably mounting said third and fourth satellite gears to said chassis, and means forming still other pressure chambers between said central gear and said third and fourth satellite gears.

13. The apparatus of claim 11 wherein the number of teeth of said central gear is not a multiple of the number of teeth of one of said satellite gear and said another satellite gear.

14. The apparatus of claim 6 wherein the number of teeth of said central gear is not a multiple of the number of teeth of said satellite gear.

15. The apparatus of claim 6 wherein said chassis includes first and second halves and means for dissipating heat including a plurality of fins and grooves.

* * * * *

UNITED STATES PATENT AND TRADEMARK OFFICE
CERTIFICATE OF CORRECTION

PATENT NO. : 4,296,849
DATED : 10-27-81
INVENTOR(S) : LUIGI PELLEGRINO

It is certified that error appears in the above—identified patent and that said Letters Patent is hereby corrected as shown below:

Column 4, line 58, "insicde" should be --inside--.

Column 6, line 7, "extend" should be --extent--.

Signed and Sealed this

Twenty-sixth Day of January 1982

[SEAL]

Attest:

GERALD J. MOSSINGHOFF

*Attesting Officer*  *Commissioner of Patents and Trademarks*